Aug. 19, 1952

R. A. FELBURG 2,607,515

CLOSURE FOR COLLAPSIBLE TUBES, WITH
PRESSURE-RESPONSIVE, RESILIENTLY
BIASED OUTLET ELEMENT

Filed Dec. 18, 1946

4 Sheets-Sheet 1

Inventor
Robert A. Felburg,

By John B. Brady
Attorney

Aug. 19, 1952 R. A. FELBURG 2,607,515
CLOSURE FOR COLLAPSIBLE TUBES, WITH
PRESSURE-RESPONSIVE, RESILIENTLY
BIASED OUTLET ELEMENT

Filed Dec. 18, 1946 4 Sheets-Sheet 2

Inventor
Robert A. Felburg,
By John B. Brady
Attorney

Aug. 19, 1952

R. A. FELBURG 2,607,515

CLOSURE FOR COLLAPSIBLE TUBES, WITH
PRESSURE-RESPONSIVE, RESILIENTLY
BIASED OUTLET ELEMENT

Filed Dec. 18, 1946

4 Sheets-Sheet 3

Inventor
Robert A. Felburg,

By John B. Brady
Attorney

Aug. 19, 1952  R. A. FELBURG  2,607,515
CLOSURE FOR COLLAPSIBLE TUBES, WITH
PRESSURE-RESPONSIVE, RESILIENTLY
BIASED OUTLET ELEMENT

Filed Dec. 18, 1946  4 Sheets-Sheet 4

Inventor
Robert A. Felburg,

By John B. Brady
Attorney

Patented Aug. 19, 1952

2,607,515

UNITED STATES PATENT OFFICE 2,607,515

CLOSURE FOR COLLAPSIBLE TUBES, WITH PRESSURE - RESPONSIVE, RESILIENTLY BIASED OUTLET ELEMENT

Robert A. Felburg, Newark, N. J.

Application December 18, 1946, Serial No. 716,948

11 Claims. (Cl. 222—496)

My invention relates broadly to the dispensing of plastic or paste-like material and more particularly to an automatic closure for attaching to dispensing tubes for substantially eliminating wastage of the contents thereof.

One of the objects of my invention is to provide an improved construction for an automatic nozzle for paste tubes having means for automatically closing the nozzle against wastage of the paste-like contents of the tube as soon as ejecting pressure is released from the external surface of the paste tube.

Still another object of my invention is to provide a construction of automatic closure for the outlet of paste tubes which is readily attachable to the screw-threaded neck of the paste tube in lieu of the standard closure cap and operating by spring pressure to close the paste tube as soon as the application of pressure is released from the external surface of the tube.

Still another object of my invention is to provide a construction of automatically controlled spring actuated closure valve for effecting the opening of the nozzle upon the application of pressure to the external surface of the paste tube and automatically effecting the closing of the valve upon release of pressure from the paste tube for preventing the wastage of the paste-like contents of the tube.

Figure 1:
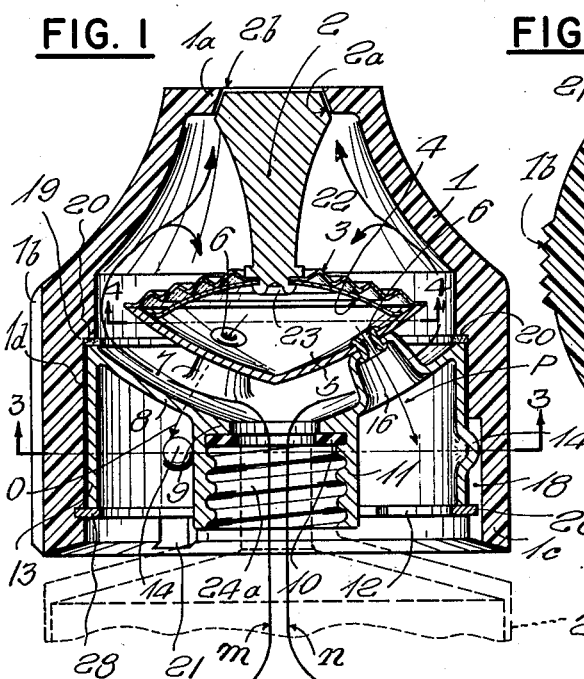
Figure 3:
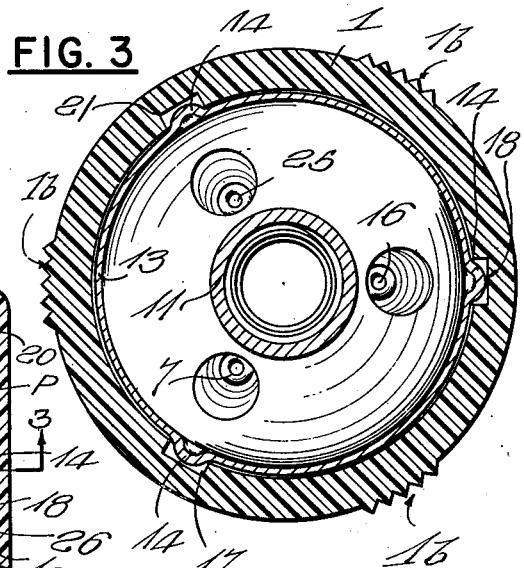
Figure 2:
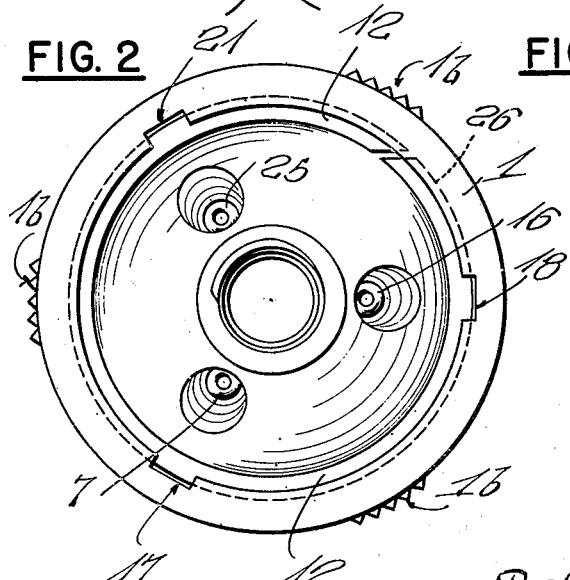
Figure 4:
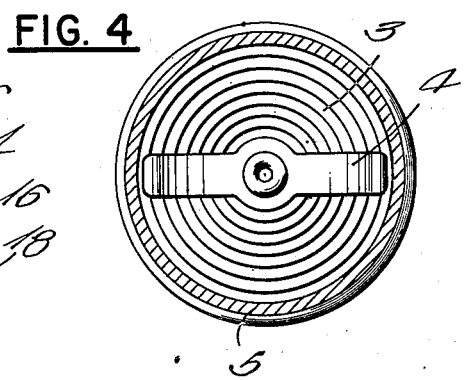
Figure 5:
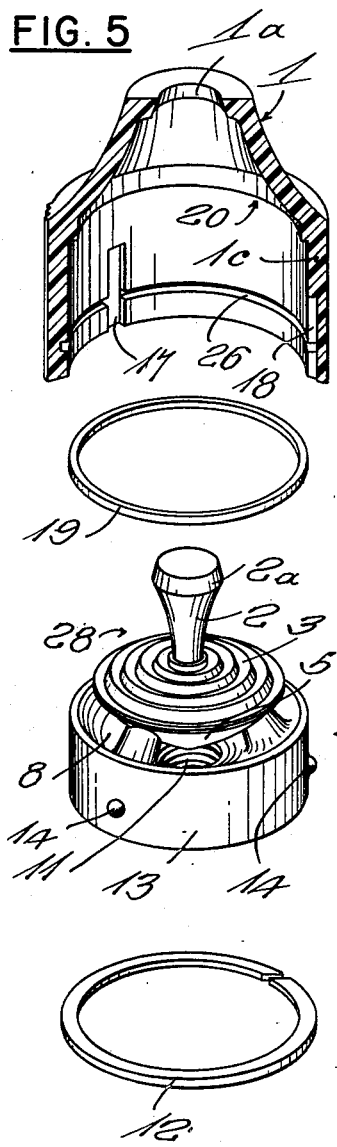
Figure 6:
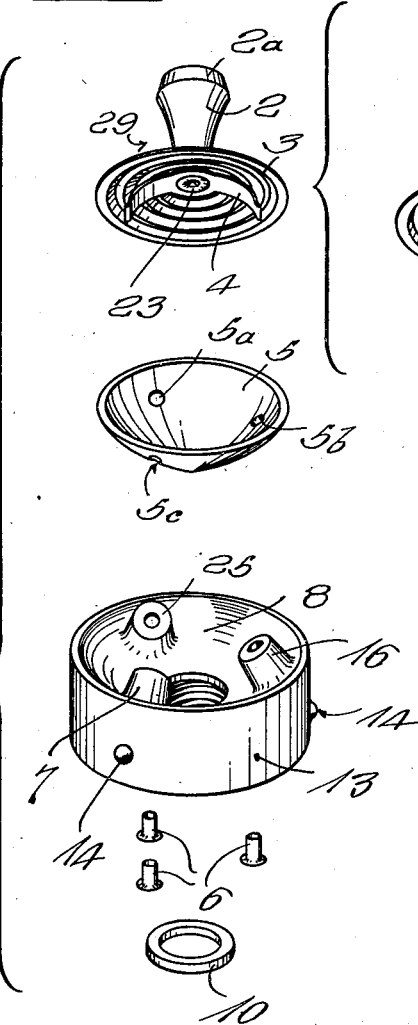
Figure 7:
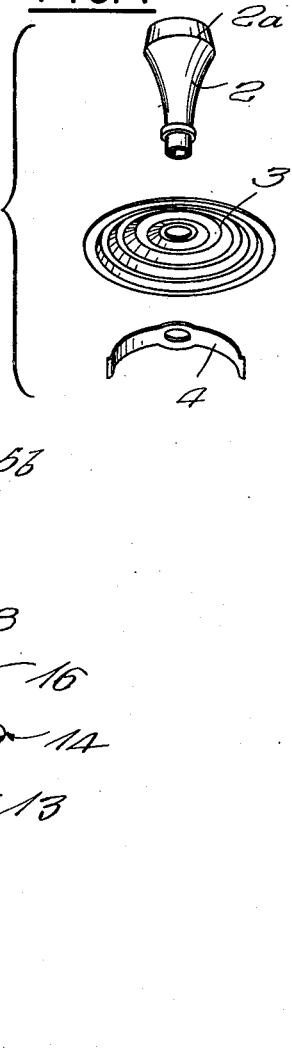
Figure 8:
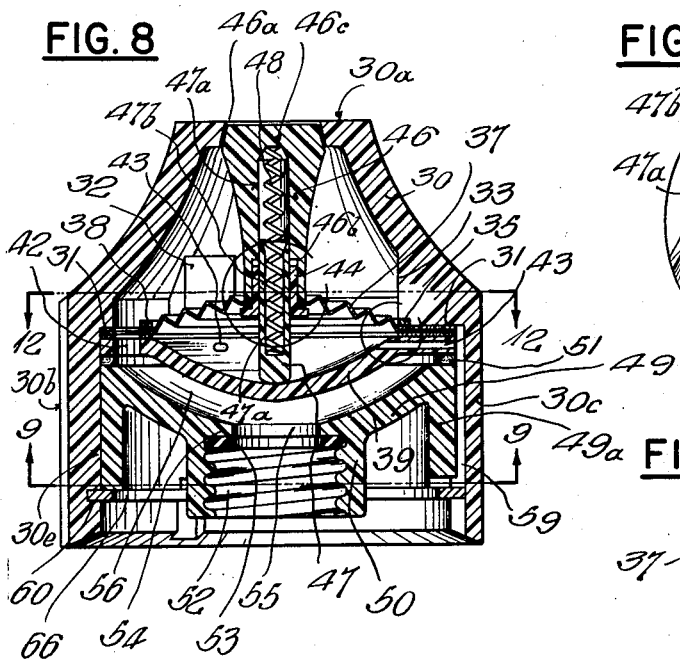
Figure 10:
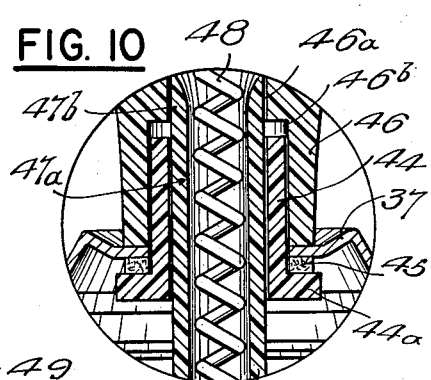
Figure 11:
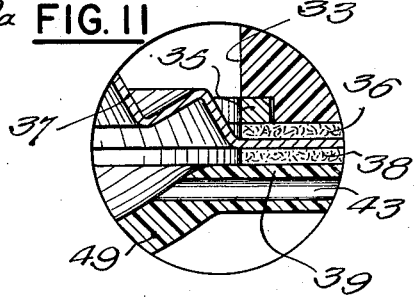
Figure 9:
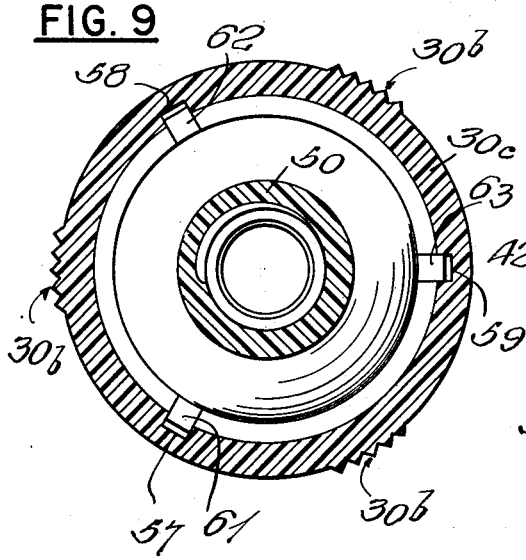
Figure 12:
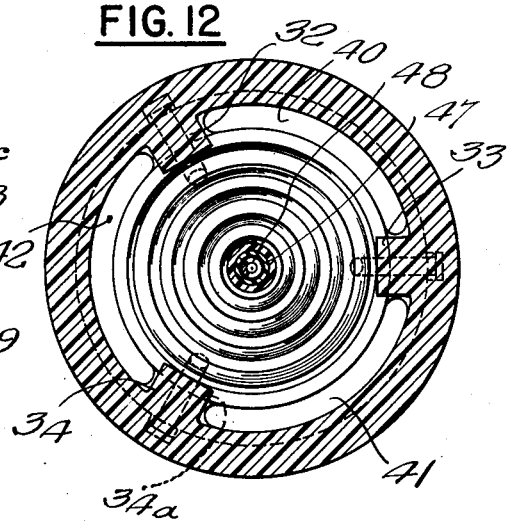
Figure 13:
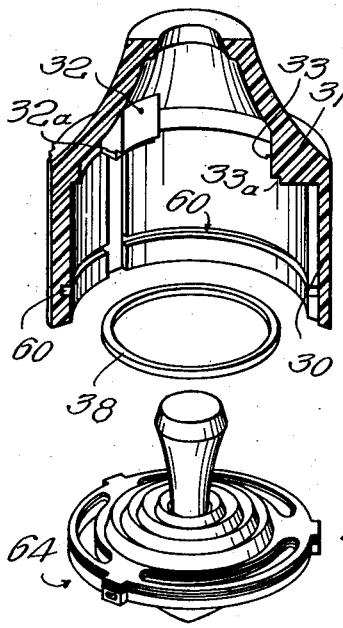
Figure 14:
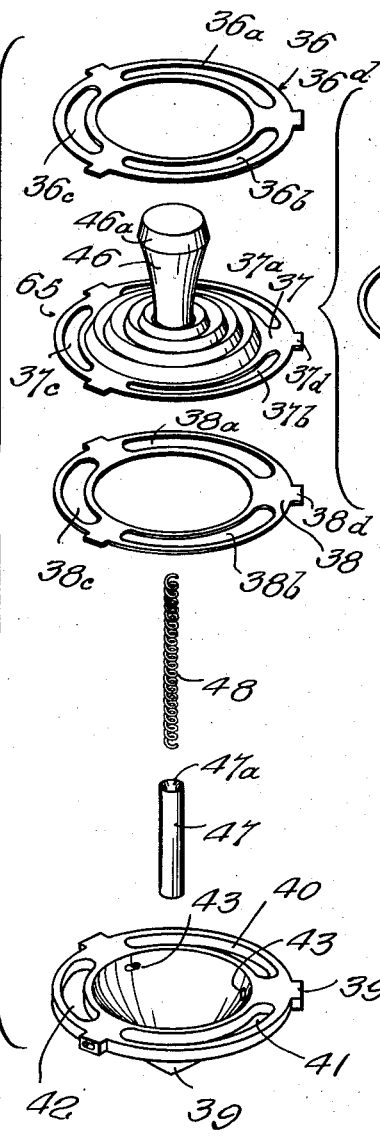
Figure 15:
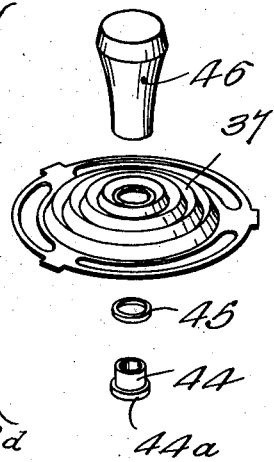

Other and further objects of my invention reside in the construction of automatic closure for the nozzle of paste tubes as set forth more fully in the specification hereinafter following by reference to the accompanying drawings in which:

Figure 1 is a cross sectional view taken through the nozzle attachment for paste tubes and illustrating the principles of my invention; Fig. 2 is a bottom plan view of the nozzle shown in Fig. 1; Fig. 3 is a horizontal sectional view taken substantially on line 3—3 of Fig. 1; Fig. 4 is a horizontal sectional view taken on line 4—4 of Fig. 1; Fig. 5 is an expanded view illustrating the relation of the parts of the nozzle in superimposed positions preparatory to assembly into the completed nozzle; Fig. 6 is an expanded view of the components of the automatic closure valve in superimposed relation embodied in the nozzle of Figs. 1–5; Fig. 7 is an expanded view of the components of the plug, shaft and operating diaphragm of the closure valve of Figs. 1–6; Fig. 8 is a vertical sectional view taken through a modified form of automatic closure nozzle embodying my invention; Fig. 9 is a horizontal sectional view taken substantially on line 9—9 of Fig. 8; Fig. 10 is a fragmentary sectional view showing the details of construction of the valve operating mechanism in the form of nozzle illustrated in Fig. 8; Fig. 11 is a detailed cross sectional view illustrating the manner of mounting the diaphragm in the construction of nozzle illustrated in Fig. 8; Fig. 12 is a horizontal sectional view taken substantially on line 12—12 of Fig. 8; Fig. 13 is an expanded view of the components comprising the nozzle construction illustrated in the modified form of my invention shown in Figs. 8–12; Fig. 14 is an expanded view of the components embodied in the operating diaphragm mechanism in the form of my invention illustrated in Figs. 8–12; and Fig. 15 is an expanded view of the components constituting the plug, shaft and diaphragm in the nozzle construction of Figs. 8–12.

Referring to the drawings in detail and particularly the form of my invention illustrated in Figs. 1–7 reference character 1 designates the nozzle which may be attached to the screw-threaded neck of any standard type of collapsible tube for dispensing paste-like material such as tooth paste, shaving cream, paints and paste-like material generally. The dispensing tube has been indicated in dotted lines at 24 having a screw-threaded neck engageable by the nozzle attachment of my invention. The nozzle 1 is molded from plastic material and tapers to a centrally apertured end 1a from a cylindrical skirt portion 1c which may be provided with groups of vertically extending ribs 1b to facilitate gripping of the cylindrical portion of the nozzle for applying or removing the nozzle from the screw-threaded neck. The fact that the nozzle is molded from plastic permits the nozzle to be formed from bright colors which substantially adds to its aesthetic properties.

The operating mechanism for the valve within the attachment includes a resilient circular diaphragm 3 formed with a multiplicity of concentric corrugations and maintained in a substantially convex position under normal conditions of pressure within the paste tube as represented in Fig. 1 of the drawings by means of a constant pressure spring strip 4. The circular corrugated diaphragm 3 and the associated spring strip 4 are secured to the end of shaft 2 which terminates in a circular tapered plug 2a which coacts with the tapered aperture 1a in the end of the nozzle 1. Thus the tapered plug 2a and the tapered wall of the central aperture 1a coact to form a closure when the shaft 2 is forced outwardly whereas an annular gap 2b is provided around the tapered surface 2a of shaft 2 and within the tapered aperture 1a of nozzle 1 when shaft 2 is retracted within the nozzle 1.

The diaphragm 3 is secured at its periphery to the relatively shallow concave member 5 provided with three equally spaced vent openings 5a, 5b and 5c. These vent openings also provide supporting means for the member 5 in the form of hollow tubular rivets 6 which project through the vent openings 5a, 5b and 5c and are fastened beneath the annularly disposed upwardly projecting hollow legs 7, 16 and 25 which are formed on the back plate 8. The back plate 8 is substantially concave in shape and is spaced away from the substantially concave member 5 for distance which permits the free flow of plastic material from the container 24 around the member 5 and diaphragm 3 to a discharge position around the head of shaft 2. The back plate 8 is connected with the cylindrical wall 13 at its external periphery and with the cylindrical sleeve 11 at its internal periphery. The cylindrical sleeve 11 is internally screw-threaded to receive the external screw threads on the neck 24a of the collapsible tube 24. Intermediate the internal sleeve 11 and the back plate 8 there is provided an annular shoulder 9 serving as a securing means or seat for the annular gasket 10 against which the annular periphery of the screw-threaded neck 24a of container 24 is adapted to be seated when the nozzle is screwed firmly upon neck 24a and collapsible tube 24.

The annular periphery of back plate 8 at the point of junction with the external cylindrical wall 13 is seated against gasket 19 which is compressed against the annular shoulder 20 formed interiorly of the skirt 1c of the molded nozzle 1. The skirt 1c of the molded nozzle 1 is provided with an interior portion of reduced section represented at 1d into which the cylindrical wall 13 of the unit carrying back plate 8 is adapted to be telescopically inserted. I provide a plurality of vertically extending grooves 17, 18 and 21 within the skirt 1c of the molded nozzle 1 for receiving and guiding the outwardly struck keys 14 which are formed on the cylindrical wall 13. The interior of the skirt 1c is provided with a transversely arranged peripheral groove 26 into which the resilient snap ring 12 is arranged to lock for retaining the cylindrical sleeve 13 in position within the nozzle 1.

When the tube 24 is squeezed the paste flows through the tube into the nozzle as shown by lines m and n. The flow travels between member 5 and back plate 8 around legs 7, 16 and 25. As shaft 2 has the exit plugged, a pressure builds up and the paste forces diaphragm 3 down into the member 5. This action pulls the shaft 2 with it and the paste flows out the opening 1a.

Meanwhile the air in shallow member 5 escapes through the three vent holes in the three legs. Arrows O and P show the air leaving the container formed by member 5, pass through the back plate 8 and exit through the space between the plastic housing and the tube 24.

When the operator releases the pressure on the tube 24 the pressure on the diaphragm 3 is released and spring 4 springs back to its normal position and pushes the diaphragm 3 with it. This action seals the nozzle 1 as the shaft 2 is pushed into the opening. Naturally air rushes back through the vent holes and fills the inside of the metal container formed between member 5 and diaphragm 3.

Plastic housing 1 is molded in one operation. Shoulder 20, vertical grooves 17, 18 and 21, and horizontal snap ring groove 26 are all molded. The metal parts are all connected together and will slide into the plastic housing. The unit is pushed against rubber washer 19 and snap ring 12 locks it in place. The snap ring 12 prevents vertical movement between the unit and the housing. The three keys 14 in the slots 17, 18 and 21 prevent rotary movement. Washers 19 and 10 prevent paste from oozing out of the attachment.

When the unit is inserted into the housing 1 the shaft 2 closes the hole 1a just before the unit hits the shoulder 20. By pushing the unit flush against the shoulder 20, the shaft pushes the diaphragm 3 a fraction of the distance into its metal container and thus a constant pressure is exerted by spring 4 on the shaft 2 assuring a tight fit at the opening.

It will be observed that flat spring 4 tends to maintain the corrugated resilient diaphragm 3 in an expanded position so that diaphragm 3 and member 5 are both convex with respect to a substantially central plane extending between the surfaces of diaphragm 3 and member 5 and that normally the inner surface of diaphragm 3 and the inner surface of member 5 are substantially concave with respect to each other. As shown more particularly in Fig. 5 it will be seen that the pressure operating unit includes the cylindrical member 13 and the resilient diaphragm unit 3 connected to shaft 2 where the member 5 is so spaced from the back plate 8 that the plastic material entering from the paste tube coupled to the internal screw threads represented on sleeve 11 is free to pass around the diaphragm 3 through the annular passage defined by the height of legs 7, 16 and 25 for discharge through the apertured end 1a of the nozzle 1.

As shown in Fig. 6 the operating unit which I have designated as 28 in Fig. 5 includes the readily assembled parts which have been shown in superimposed expanded positions preparatory to assembly.

It will be noted in Fig. 7 that the plug unit which I have designated at 29 in Fig. 6 comprises an assembly of three simple parts consisting of shaft 2, diaphragm 3 and flat spring 4.

Shaft 2 may be turned out on an automatic screw machine. Rivet 23 is formed by countersinking the end of the shaft 2. The purpose of the shoulder 22 on shaft 2 is to back up the diaphragm 3 on one side; and the other side of the shoulder 22 provides a rest to support the shaft 2 when the rivet 23 is hammered down. If it were rested on the head of the shaft 2, the plug would lose its perfect circular shape and not form a good seal. Diaphragm 3 has a hole in the center to allow the rivet-to-be to pass through it. Spring 4 is shown in a cross-sectional and a top view. When the diaphragm 3 and spring 4 are slipped over the rivet, the rivet is hammered down and the unit as shown in Fig. 6 at 29 is formed.

In the manufacture of the structure of my invention the rivets 6 are inserted into the holes of the back plate 8 from the back. The unit is supported in a jig by the three rivets. Metal member 5 is placed over the rivets 6 so the legs are flush with the metal member 5. Then the rivets are turned over forming a water-proof and air-proof joint. Then diaphragm 3 is placed on the metal member 5. Spring 4 is fitted in place, the unit is forced down until the diaphragm 3 contacts the edge of the member 5. It is then soldered in place to form an air-tight compartment, except for the three vent holes. Then the completed unit is slid into plastic housing 1 and snap ring 12 inserted in slot 26 for locking the unit in place.

Referring to the modified form of my invention illustrated in Figs. 8-15 it will be seen that a number of metal parts have been eliminated and parts made from molded material substituted. In this form of my invention the number of metal parts coming in contact with the plastic contents of the tube are reduced and the amount of riveting, soldering, drilling and machining almost entirely eliminated thereby reducing manufacturing costs. In this arrangement the nozzle is molded from plastic material as represented at 30 terminating in an apertured end 30a and having a cylindrical skirt 30c with longitudinally extending manually grippable ribs 30b for facilitating the attachment or removal of the nozzle from the screw-threaded neck of the plastic tube. In this form of my invention the nozzle 30 is provided with an internal section of reduced diameter 30e terminating in an annular shoulder 31. I also provide three symmetrically arranged shoulder members 32, 33 and 34 extending radially inwardly interiorly of the nozzle 30. Each of these shoulder members is provided with a recessed edge portion represented at 32a, 33a and 34a which serve to seat and center the stainless steel annular washer member 35 which forms a centering and securing means for the annular gasket 36 which extends beneath the members 32, 33 and 34 and beneath the annular shoulder 31 and supports the peripheral edge of the displaceable diaphragm 37. The opposite side of the annular peripheral edge of diaphragm 37 is seated against gasket 38 which rests upon the peripheral edge of the diaphragm housing 39. The diaphragm housing 39 in this instance is also formed from molded plastic with arcuate shaped slots 40, 41 and 42 molded in the flat peripheral edge thereof in alignment with the arcuate slots in gaskets 36 and 38 which I have represented at 36a, 36b, 36c and 38a, 38b and 38c. The diaphragm housing 39 is provided with pressure release ports 43 therein properly distributed to release air pressure from the rear of resilient diaphragm 37.

The diaphragm 37 is provided with a multiplicity of concentric circular corrugations permitting resilient displacement of the diaphragm with reference to the diaphragm housing 39. The center of the diaphragm 37 is apertured for the passage of the cylindrical sleeve member 44 which has a flange 44a bearing against a gasket 45 which bears against one side of diaphragm 37. The shaft 46 is centrally apertured as represented at 46a and is provided with a cylindrical recess as represented at 46b for concentrically receiving the sleeve 44. A solvent is applied to the outer surface of the plastic fitting 44 for effecting a firm interconnection with the recessed end 46b of shaft 46 thereby establishing a firm interconnection between shaft 46 and diaphragm 37. The recess 46a in shaft 46 forms a socket into which the plastic shaft 47 is arranged to telescopically slide. The plastic shaft 47 is axially recessed at 47a for receiving the compression coil spring 48 which presses against the bottom of shaft 47 and the top of shaft 46. The partially tapered end of the hole in shaft 46 as represented at 46c insures that the coil spring 48 will remain centered. The tapering open end of the shaft 47 at 47b prevents the spring 48 from catching upon any projecting surface. Thus shaft 46 is centered with respect to diaphragm 37 and is maintained in alignment with the aperture 30a in nozzle 30 as diaphragm 37 is collapsed or restored to normal position.

The back plate 8 and screw-threaded connection means for the neck of the metallic tube is shaped in a manner quite similar to the shape of the back plate 8 in the form of my invention shown in Figs. 1-7 but in this instance the back plate is molded as represented at 49 and connects with the cylindrical outer wall 49a and a cylindrical inner wall 50. The juncture of the outer wall 49a with back plate 49 bears against the sealing gasket 51 for preventing leakage of plastic material. The cylindrical inner wall 50 is internally screw-threaded as represented at 52 for engaging the screw-threaded neck of the collapsible tube which seats against the sealing gasket 53 secured against the annular shoulder 54 intermediate cylindrical inner wall 50 and back plate 49. When the plastic tube is connected with wall 50 the plastic contents from the tube may be squeezed through the neck of the tube and through aperture 55 adjacent shoulder 54 and through the annular space 56 between back plate 49 and diaphragm housing 39 escaping through arcuate shaped slots 40, 41 and 42 and aligned slots 36a, 37a and 38a, 36b, 37b and 38b, and 36c, 37c and 38c into the chamber within the interior of nozzle 30 over diaphragm 37 and around shaft 46. As the pressure builds up over diaphragm 37 the shaft 46 is forced inwardly against the pressure of compression spring 48 and plastic material is ejected through aperture 46a. As soon as pressure is released upon the supply tube the pressure of the flowing plastic decreases and compression spring 48 overcomes the pressure previously built up forcing the shaft 46 to a position which closes the tapered inclined face 46a of the shaft 46 into intimate contacting relation to the tapered face 30a of nozzle 30 for thereby closing the nozzle and preventing wastage of the plastic contents of the supply tube.

The assembly of the molded construction of nozzle illustrated in Figs. 8-15 is even simpler than the assembly of the metallic construction illustrated in Figs. 1-7 in that the cylindrical skirt 30c of the molded nozzle 30 is provided with equally spaced longitudinally extending internal grooves 57, 58 and 59 interconnected by a laterally disposed circular groove 60. The cylindrical outer sleeve 59 of the tube supporting unit is provided with a multiplicity of co-acting radially extending keys 61, 62 and 63 which are arranged to project into and slide in the key ways formed by slots 57, 58 and 59 for centering and confining the tube supporting unit within the nozzle. Likewise the pressure operating unit is centered and confined within the nozzle by virtue of an arrangement of radially extending aligned lugs which are provided on the gasket 36, diaphragm 37 and gasket 38 and diaphragm housing 39 as shown more clearly in Fig. 14. These aligned lugs are shown at 36d on gasket 36, at 37d on diaphragm 37, 38d on gasket 38 and 39d on diaphragm housing 39.

In Fig. 13 I have shown the pressure operating unit in assembled relation at 64. The components for the pressure operating unit 64 are illustrated in superimposed relation in Fig. 14.

The components comprising the pressure actuated diaphragm, shaft, securing means therefor and the plug shaped valve are illustrated as a unit at 65 in Fig. 14 and shown in superimposed expanded relation in Fig. 15.

When the tube supporting unit has been moved to assembled relation with the nozzle as illustrated in Fig. 8 the snap ring 66 is moved into locking position entering transverse groove 69 thus forming a ledge against which the tube supporting unit is maintained against withdrawal from the nozzle. Collapsing of the snap ring 66 for withdrawal from the groove 69 is sufficient to permit withdrawal of the tube supporting unit and pressure operating unit for repair, maintenance or replacement of parts.

The nozzle attachment of my invention may be sold as an accessory for use on dispensing tubes from time to time. As the supply of plastic material in one tube is depleted a fresh tube may be connected to the nozzle and the nozzle used practically indefinitely for replacement tubes which are purchased from time to time.

The differential pressure which is built up by squeezing the collapsible tube for ejecting the tube contents operates in both forms of my invention for overcoming the tension of spring 4 in the form of my invention illustrated in Figs. 1–7 and the spring 48 in the form of my invention illustrated in Figs. 8–15 and it is this differential pressure which automatically controls the opening or closing of the plug at the end of the nozzle.

While I have described my invention in certain of its preferred embodiments I realize that modifications in the construction and arrangement of parts of the nozzle of my invention may be made and I desire that it be understood that no limitations upon my invention are intended other than may be imposed by the scope of the appended claims.

What I claim as new and desire to secure by Letters Patent of the United States is as follows:

1. An automatic closure for paste dispensing tubes comprising a screw-threaded nozzle attachable to the screw-threaded end of a paste dispensing tube, a cover member supported in spaced relation to said nozzle, said cover member substantially conforming with the contour of the paste dispensing tube with which said screw threaded nozzle is connected and terminating in a paste dispensing orifice, a plug for closing said orifice, a diaphragm member connected with said plug, means biasing said plug to orifice-closing position, and a hollow-convex member supporting said diaphragm member at the periphery thereof in spacial relation to said nozzle and within said cover member the periphery of said hollow-convex member being spaced from the inner walls of said cover member thereby affording a passageway between said nozzle and said dispensing orifice whereby the pressure of paste ejected from a dispensing tube operates to force paste-like contents of the tube around said hollow-convex member and over said diaphragm member for depressing said diaphragm member for opening said orifice while the paste is being ejected and close said orifice when ejecting pressure is discontinued.

2. An automatic closure for paste dispensing tubes comprising a multiple section nozzle attachable to the dispensing neck of a paste dispensing tube, one of the sections of said nozzle comprising a cover member substantially conforming with the contour of the paste dispensing tube with which said nozzle connects and terminating in a paste dispensing orifice and another of said sections comprising a hollow-convex supporting structure arranged internally within the aforesaid cover member and extending transversely thereof in spaced relation to the interior walls thereof, a diaphragm carried by said convex supporting structure, a central shaft connected with said diaphragm and terminating in a plug operative to close the discharge orifice in the end of said first mentioned section, and spring means for normally biasing said plug to a position closing said orifice, said diaphragm when subjected to pressure incident to the ejection of paste from said tube operating to collapse into said convex supporting structure and displace said plug for opening said discharge orifice, said plug automatically operating to close said discharge orifice as soon as discharge pressure is released from said dispensing tube.

3. An automatic closure for paste dispensing tubes of the type for ejecting paste-like tube contents under deformation of the walls of the tube comprising a closure having a pair of telescopically inter-engaging sections, one of said sections terminating at one end in an end discharge orifice and substantially conforming at the other end with the contour of the tube with which said section connects, a shaft terminating in a plug operative to move into and out of the discharge orifice for closing or opening the orifice, a diaphragm connected with the inner end of said shaft, a hollow-convex supporting means for peripherally mounting said diaphragm within said first mentioned section in spaced relation to the interior walls thereof and subject to discharge pressure of contents of the paste dispensing tube, spring means for normally biasing said diaphragm to a position projecting outwardly from said hollow-convex supporting means whereby said plug closes the discharge orifice, the discharge pressure of the paste being effective against said diaphragm for collapsing said diaphragm into said hollow-convex supporting means and displacing said plug from the orifice in the end of said first mentioned section while ejection pressure is applied to said dispensing tube.

4. An automatic closure for paste tube dispensing devices comprising a two-section attachment for the neck of a paste tube, said sections comprising an inner attachment section and an outer closure section, said outer closure section terminating at one end in an orifice and having the other end thereof substantially conforming with the contour of the paste tube with which said inner attachment section connects, a hollow-convex diaphragm supporting means carried by said inner attachment section in spaced relation to the interior walls thereof, a diaphragm mounted on the periphery of said hollow-convex diaphragm supporting means, a shaft connected with said diaphragm and terminating in a plug movable into or out of the orifice in said outer section, spring means for normally biasing said plug to a position closing the orifice in said outer section, said diaphragm operating under pressure resulting from the ejection of contents of the paste dispensing tube to effect displacement thereof into said hollow-convex diaphragm supporting means for withdrawing said plug from the orifice in the end of said first mentioned section for ejecting the contents of the dispensing tube so long as dispensing pressure is applied thereto.

5. An automatic closure for paste tube dispensing devices comprising a molded nozzle apertured at one end thereof and substantially conforming at its other end with the contour of a paste tube, a pair of separable sections coaxially arranged within said nozzle, one of said sections comprising unit attachable to the neck of a paste tube and the other of said sections comprising a hollow-convex pressure responsive unit, said units being spacially related for the passage of paste-like contents from a paste tube peripherally around said pressure responsive unit and in a path over said pressure responsive unit for ejection through the apertured nozzle, said pressure responsive unit including a convex resilient diaphragm and an aperture closing plug carried thereby whereby pressure exerted by the paste-like contents from the paste tube under the action of ejection tends to collapse said diaphragm into said hollow-convex pressure responsive unit for retracting said plug from the apertured nozzle for permitting the ejection of paste-like contents therethrough and spring means for normally biasing said plug into closed relation with said apertured nozzle.

6. An automatic closure for paste dispensing tubes comprising a screw-threaded nozzle attachable to the screw-threaded end of a paste dispensing tube, a cover member supported in spaced relation to said nozzle, said cover member terminating in a paste dispensing orifice at one end and substantially conforming at its other end with the contour of a paste dispensing tube with which said nozzle connects, a plug normally closing said orifice, a substantially convex diaphragm member connected with said plug, means supporting said substantially convex diaphragm member in spacial relation to said nozzle and within said cover member in a position spaced from the interior walls thereof and spring means disposed beneath said diaphragm member and normally tending to maintain said diaphragm member in expanded position but yieldable under pressure created by the passage of paste in the course of the ejection thereof whereby the pressure of paste ejected from a dispensing tube operates to depress said diaphragm for opening said orifice while the paste is being ejected and close said orifice when ejecting pressure is discontinued.

7. An automatic closure for paste dispensing tubes comprising a screw-threaded nozzle attachable to the screw-threaded end of a paste dispensing tube, a pressure responsive unit including a diaphragm support of substantially convex contour, a pressure displaceable diaphragm member peripherally connected with said substantially convex diaphragm support, a plug carried by said diaphragm, means for spacially mounting said diaphragm support relative to said screw-threaded nozzle and a cover member apertured at the end thereof in alignment with the plug carried by said diaphragm and substantially conforming at its other end with the contour of the paste dispensing tube with which said cover member connects, means biasing said plug to a position closing said apertured cover member, said cover member enclosing said screw-threaded nozzle and said pressure responsive unit the periphery of said diaphragm support being spaced from the inner walls of said cover member thereby affording a passageway between said nozzle and said diaphragm support whereby the pressure of paste during the movement of the paste peripherally around and over said pressure responsive unit operates to displace said diaphragm for moving said plug with respect to said apertured cover member for ejection of paste, said diaphragm operating to restore said plug to closed position with respect to said apertured cover member at the conclusion of the dispensing operation.

8. An automatic closure for paste dispensing tubes of the type for ejecting paste-like tube contents under deformation of the walls of the tube comprising a nozzle-like housing terminating in an apertured ejecting end portion at one end and a skirt at the other end that substantially conforms with the contour of the paste dispensing tube with which said housing connects, a pair of sections insertable into said housing, one of said sections consisting of a pressure responsive unit and the other of said sections consisting of a unit attachable to the neck of a paste tube, spacing members carried by one of said sections and connected with the other of said sections for spacing said sections to provide a passage for paste-like material therebetween and peripherally around one of said sections and a plug carried by said pressure operating unit and operative to open and close the aperture in the end of said nozzle-like housing dependent upon the pressure exerted against said pressure responsive unit.

9. An automatic closure for paste dispensing tubes of the type for ejecting paste-like tube contents under deformation of the walls of the tube comprising a nozzle-like housing terminating in an apertured ejecting end portion at one end and in a portion substantially conforming with the contour of the dispensing tube, with which said housing connects, at the other end, a pair of sections insertable into said housing, one of said sections consisting of a pressure responsive unit and the other of said sections consisting of a unit attachable to the neck of a paste tube, said units being spacially related to provide a passage for paste-like material therebetween and peripherally around one of said sections, a substantially hollow plug carried by said pressure responsive unit and operative to enter or retract from the apertured end of said nozzle-like housing, spring means extending through said hollow plug and normally operating to maintain said plug in sealed relation to the apertured end of said nozzle-like housing, and means operated by the pressure of paste-like material in the course of ejection thereof for effecting a retraction of said spring means for opening the passage between said plug and apertured end of the nozzle-like housing for effecting ejection of the paste-like material therethrough, said spring means operating to move said plug to closed position upon cessation of pressure upon the paste-like contents of the paste tube.

10. An automatic closure for paste dispensing tubes of the type for ejecting paste-like tube contents under deformation of the walls of the tube comprising a nozzle-like housing terminating in an apertured ejecting end portion at one end and in a portion substantially conforming with the contour of the dispensing tube, with which the housing connects, at the other end, a pair of sections insertable into said housing, one of said sections consisting of a pressure responsive unit and the other of said sections consisting of a unit attachable to the neck of a paste tube, said units being spacially related to provide a passage for paste-like material therebetween and peripherally around one of said sections, a substantially hollow plug carried by said pressure responsive unit and operative to enter or retract from the apertured end of said nozzle-like housing, spring means extending through said hollow plug and normally operating to maintain said plug in sealed relation to the apertured end of said nozzle-like housing and a diaphragm connected with said plug and operative under conditions of pressure exerted by the paste-like contents in the course of the passage thereof through said nozzle-like housing for overcoming the tension of said spring and effecting a retraction of said plug for ejecting the paste-like contents through the apertured end of said nozzle-like housing, said spring means operating to move said plug to closed relation with the apertured end of said nozzle-like housing upon cessation of pressure upon the paste-like contents within the paste tube.

11. An automatic closure for paste dispensing tubes of the type for ejecting paste-like tube contents under application of pressure to the walls of the tube, comprising a nozzle-like closure centrally apertured in the end thereof, means for attaching the closure to the screw-threaded neck of a paste tube said nozzle-like closure having a coextensive annular skirt substantially conforming with the contour of the paste dispensing tube with which said closure connects, a plug mounted for longitudinal movement within said nozzle-like closure, a hollow-convex support centrally positioned within said nozzle-like closure in a position peripherally spaced from the interior walls of said nozzle-like closure, pressure responsive means carried by said hollow-convex support, means for supporting said plug on said pressure responsive means and displacing said plug axially into said nozzle-like closure upon increase in pressure of the paste-like contents upon said pressure responsive means during the ejection thereof around said pressure responsive means and spring means associated with said pressure responsive means and operative to shift said plug into closed position with the apertured end of said nozzle-like closure upon cessation in applied pressure upon the paste-like contents of the paste tube.

ROBERT A. FELBURG.

REFERENCES CITED

The following references are of record in the file of this patent:

UNITED STATES PATENTS

| Number | Name | Date |
|---|---|---|
| 1,154,163 | Ballou | Sept. 21, 1915 |
| 1,592,402 | Wilcox | July 13, 1926 |
| 1,621,097 | Zammataro | Mar. 15, 1927 |
| 1,862,794 | Lamb | June 14, 1932 |
| 1,883,716 | Greenless | Oct. 18, 1932 |
| 1,955,372 | Wood | Mar. 26, 1935 |
| 2,055,694 | Lundgren | Sept. 29, 1936 |
| 2,159,161 | Isler | May 23, 1939 |
| 2,170,588 | Douglas | Aug. 22, 1939 |
| 2,185,323 | Arnold | Jan. 2, 1940 |
| 2,194,039 | Wekerle | Mar. 19, 1940 |
| 2,302,538 | Fuchslocher | Nov. 17, 1942 |

FOREIGN PATENTS

| Number | Country | Date |
|---|---|---|
| 787,371 | France | July 1, 1935 |